US011012636B2

United States Patent
Marechal et al.

(10) Patent No.: US 11,012,636 B2
(45) Date of Patent: May 18, 2021

(54) IMAGE/VIDEO CAPTURING METHOD AND APPARATUS

(71) Applicant: Intel Corporation, Santa Clara, CA (US)

(72) Inventors: Herve Marechal, Saint Paul de Vence (FR); David Gottardo, Roquefort les Pins (FR)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 16/303,602

(22) PCT Filed: Jun. 22, 2016

(86) PCT No.: PCT/US2016/038823
§ 371 (c)(1),
(2) Date: Nov. 20, 2018

(87) PCT Pub. No.: WO2017/222522
PCT Pub. Date: Dec. 28, 2017

(65) Prior Publication Data
US 2020/0322547 A1    Oct. 8, 2020

(51) Int. Cl.
*H04N 5/262* (2006.01)
*H04N 5/232* (2006.01)

(52) U.S. Cl.
CPC ....... *H04N 5/2628* (2013.01); *H04N 5/23299* (2018.08)

(58) Field of Classification Search
CPC .. H04N 5/2252; H04N 5/2253; H04N 5/2254; H04N 5/23258; H04N 5/2628; H04N 5/23299
See application file for complete search history.

(56) References Cited

U.S. PATENT DOCUMENTS 5,872,594 A    2/1999  Thompson
2004/0201756 A1    10/2004  VanBree
(Continued)

FOREIGN PATENT DOCUMENTS

KR    10-2015-0059591 A    6/2015

OTHER PUBLICATIONS

International Search Report and Written Opinion dated Jan. 16, 2017 for International Patent Application No. PCT/US2016/038823, 12 pages.

*Primary Examiner* — Amy R Hsu
(74) *Attorney, Agent, or Firm* — Schwabe, Williamson & Wyatt, P.C.

(57) ABSTRACT

Apparatuses, methods and storage medium associated with capturing images are described herein. In embodiments, an apparatus may include an image or video capturing application to capture one or more images using a camera worn on a user's head, that includes an orientation function to receive a collection of a plurality of sensor data, and process the collection of sensor data to determine desired and actual orientations of the camera, and a control function to control the camera, to delay or suspend activation of the camera, if the actual orientation is misaligned with the desired orientations of the camera in excess of a misalignment threshold. In embodiments, the one or more images may be part of a time series of images or videos. Other embodiments may be described and/or claimed.

20 Claims, 5 Drawing Sheets

(56) References Cited

U.S. PATENT DOCUMENTS

| | | | |
|---|---|---|---|
| 2010/0331721 A1* | 12/2010 | Epley | A61B 5/4863 600/552 |
| 2014/0002674 A1* | 1/2014 | Duparre | G02B 7/005 348/187 |
| 2015/0036047 A1* | 2/2015 | Bledsoe | H04N 5/2253 348/375 |
| 2016/0117860 A1* | 4/2016 | Fei | G06F 3/04815 345/419 |
| 2016/0373647 A1* | 12/2016 | Garcia Morate | G06T 3/4038 |
| 2017/0026568 A1* | 1/2017 | Haehnichen | G06F 3/167 |
| 2017/0310901 A1* | 10/2017 | Sheikh | H04N 5/23216 |
| 2018/0349008 A1* | 12/2018 | Manzari | H04N 5/23219 |

\* cited by examiner

IMAGE/VIDEO CAPTURING METHOD AND APPARATUS

CROSS REFERENCE TO RELATED APPLICATIONS

The present application is a national phase entry under 35 U.S.C. § 371 of International Application No. PCT/US2016/038823, filed Jun. 22, 2016, entitled "IMAGE/VIDEO CAPTURING METHOD AND APPARATUS", which designated, among the various States, the United States of America. The entirety of the PCT/US2016/038823 Application is hereby incorporated by reference.

TECHNICAL FIELD

The present disclosure relates to the field of digital photography/video. More particularly, the present disclosure relates to image/video capturing methods and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits, digital photography/video has become ubiquitous. In recent years, head-worn, or generally body-worn, cameras have gained increased popularity. Frequently, users of head/body-worn cameras would like to make a time lapse or hyper lapse movie by capturing a time series of images/videos, e.g., every 30 seconds, every minute, or every 15 minutes, and so forth. Frequently, users would prefer these time series images/videos being taken from a consistent view, e.g., a frontal view, reflecting what the user sees.

One issue with taking a time series of images with head-worn cameras is that the user may change his head orientation away from the desired frontal orientation when an image/video is about to be capture. For instance, when recording a time lapse movie while cycling up a mountain pass, the user might change his head orientation to the his left or right side to look at a car passing him, consulting road traffic signs, and so forth, just at the moment when an image is to be captured. As a result, the captured scene in an image/video is not towards the path the camera/bike has been following. In turn, the time lapse movies formed with the captured images/videos might look like a collection of random shots front, left and right, and appear unnatural and unpleasant. Typically, the user will have to engage in post filming editing to create a more coherent movie that is more natural and pleasant. Even with post filming editing, the improvement might be limited, since a number of the properly oriented images/videos may be missing.

While existing wearable cameras may include technologies to address the issue of image/video stability, there are no known technologies that assist/address the above described issue associated with capturing a time series of images/videos to produce a more natural and pleasant time lapsed movie.

BRIEF DESCRIPTION OF THE DRAWINGS

Embodiments for generation and animation of avatars will be readily understood by the following detailed description in conjunction with the accompanying drawings. To facilitate this description, like reference numerals designate like structural elements.

Embodiments are illustrated by way of example, and not by way of limitation, in the figures of the accompanying drawings.

DETAILED DESCRIPTION

Apparatuses, methods and storage medium associated with capturing images are described herein. In embodiment, an apparatus may include one or more processors: and an image or video capturing application to be operated by the one or more processors to capture one or more images using a camera worn on a user's head, that includes an orientation function to determine a desired and an actual orientation of the camera, wherein to determine, the orientation function is to receive a collection of a plurality of sensor data, and process the collection of sensor data to determine the desired and actual orientations of the camera; a control function to control the camera, wherein to control, the control function is to delay or suspend activation of the camera, if the actual orientation is misaligned with the desired orientations of the camera in excess of a misalignment threshold. In embodiments, the one or more images may be part of a time series of images or videos.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs (having a number of machine instructions generated from assembler instructions or complied from higher level language instructions), a combinational logic circuit, and/or other suitable components that provide the described function s/functionalities.

Figure 1:
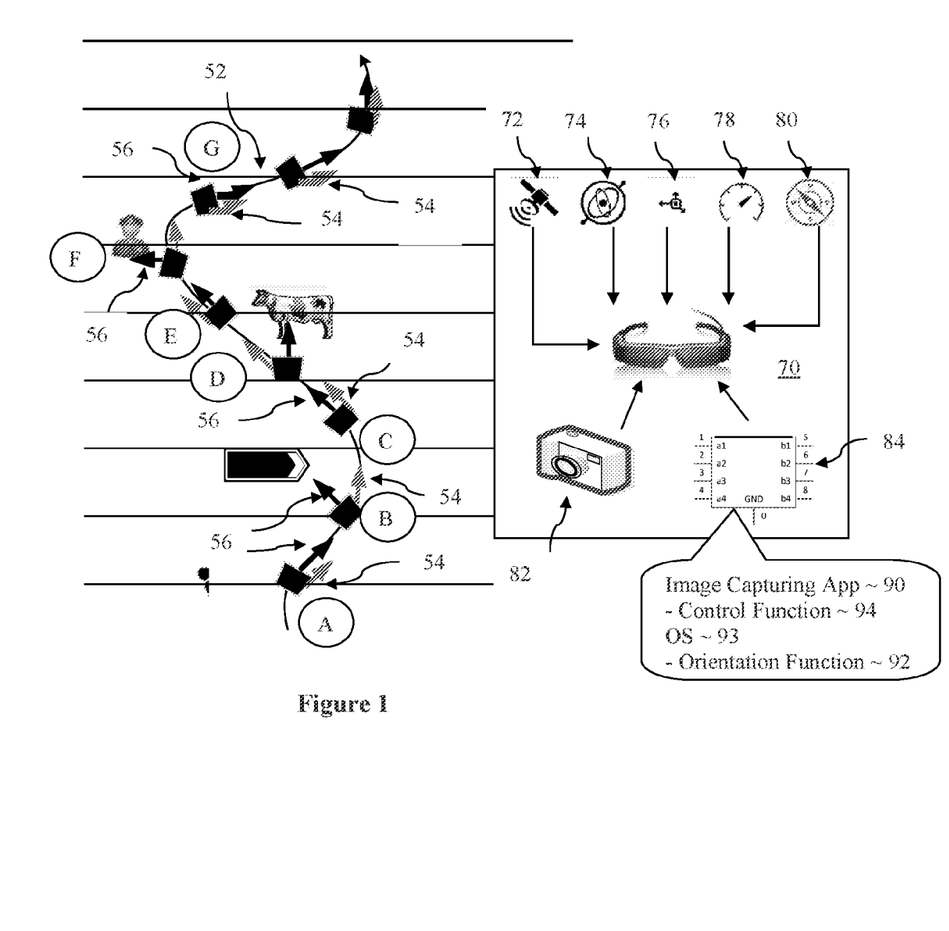
FIG. 1 illustrates an example wearable device incorporated with the image/video capturing technology of the present disclosure, according to various embodiments.

Referring now to FIG. 1, wherein a diagram illustrating the image capturing technology of the present disclosure, according to various embodiments, is depicted. As shown, a user (not shown) may be wearing a head-worn device, such as eyeglass 70 having integrated camera 82. Integrated camera 82 may be configured to enable a user to program integrated camera 82 to capture a collection of time series images or videos while traveling on a route, such as route 52. For examples, a user may program integrated camera 82 to capture an image or a short video every 30 seconds, every minute, every 15 minutes, and so forth.

Arrows 54 denote the desired orientation of camera 82 at various points in time along route 52, which may be aligned with the corresponding forward directions of route 52. Arrows 56, on the other hand, denote the actual orientations of the user's head and camera 82 at the same points in time along route 52. The desired and actual orientations of camera 82, at the various points in time, may or may not be aligned. For example, at point B, the user may be distracted by a road sign, looking left ~45 degrees from the desired frontal orientation, at point D, by an animal; looking right ~45 degrees from the desired frontal orientation; at point F, by a traffic officer, looking left ~90 degrees from the desired frontal orientation, and so forth. Thus, if images or videos were captured at these points in time (B, D and F), the images or videos will not have the desired forward view, inconsistent with images or videos captured at other points in time (A, C, E and G) when the actual and desired orientations of the camera are aligned.

The problem may be advantageously solved by the image/video capturing technology of the present disclosure incorporated with wearable device 70, which may track the desired and actual orientations of camera 82, and delay the capturing of an image/video, at an activation time, if the desired and actual orientations are detected to be misaligned in excess of a misalignment threshold. For video application, the duration of the video to be captured may be shorten. For example, on detection of the excessive misalignments at activation points B, D and E, the image/video capturing technology of the present disclosure may cause the capturing of the images/video to be respectively delayed to points C. E and G instead (or shortened until these points, in the case of video), where the actual and desired orientations are substantially aligned. In embodiments, the image/video capturing technology of the present disclosure, in lieu of waiting for detection of actual alignment, predicts when the desired and actual orientations may be aligned again (e.g., points, B, D and E), and delay the activations (or resumed the shortened capturing of videos) based on the predictions (to be described more fully below).

As illustrated, in embodiments, wearable device 70, in addition to camera 82, may include a number of sensors, such as, but are not limited to, global positioning system (GPS) 72, gyroscopes 74, accelerometer 76, speedometer 78, and compass 80. Additionally, in embodiments, wearable device 70 may include processor 84 having image/video capturing application 90 and operating system (OS) 93. OS 93 may include orientation function 92 configured to track the desired and actual orientations of camera 82, based at least in part on the sensor data provided by sensors 72-80. Image/video capturing application 90 may include control function 94 configured to control camera 82 to capture successive time series images/videos (e.g., as programmed by a user). To enhance the consistency of the time series images/videos captured (i.e. from substantially the same view point), control function 94 may be configured to delay activation of camera 82 (or shorten the capturing, in the case of video), if at an activation point/duration in time, the actual orientation of camera 82 (as determined by orientation function 92) is misaligned from the desired orientation of camera 82 (as determined by orientation function 92) in excess of a misalignment threshold, e.g., greater than 30 degrees in either direction. In embodiments, on detection of an excessive misalignment, control function 94 may predict when the desired and actual orientations may be aligned again, and delay the activation (or resumption of capturing) based on the prediction. In other embodiments, the amount of delay may be limited to a configurable maximum amount.

These and other aspects of the image/video capturing technology of the present disclosure will be further described with references to the remaining figures. But before doing so, it should be noted that, while wearable device 70 is illustrated as an eyeglass in FIG. 1, the present disclosure may be incorporated into any wearable device, e.g., but are not limited to, a motor cycling helmet, a biking helmet, a skiing helmet, a fighter pilot's helmet, an astronaut's helmet, a diver's helmet, a hard hat, a snorkeling goggle, a head band, an ear ring, an ear phone, and so forth. Further, wearable device 70 may have more or less sensors 72-80 incorporated therein to provide the sensor data.

Figure 2:
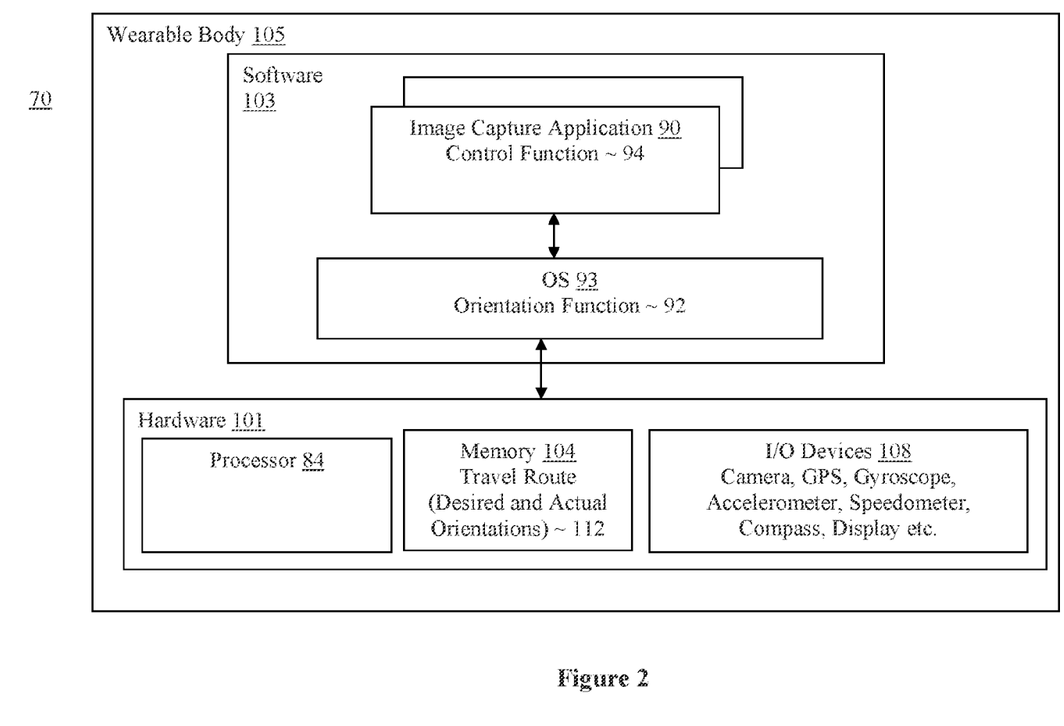
FIG. 2 illustrates example hardware and software components of the wearable device of FIG. 1, according to various embodiments.

Referring now to FIG. 2, wherein an example architectural view of the wearable device of FIG. 1, according to various embodiments, is illustrated. As shown, in embodiments, wearable device 70 may include wearable body 105 hosting hardware 101 and software 103, operatively coupled with each other as shown. Hardware 101, as described earlier, may include processor 84, and additionally, memory 104 and input/output (I/O) devices 108. Software 103, as described earlier, may include OS 93 and image capture applications 90.

Except for its use to execute image capturing application 90 and OS 93, processor 102 may any one of a number of processors known in the art, having one or more processor cores. Memory 104 may be any known volatile or non-volatile memory known in the art, suitable for storing instructions and data, e.g., data 112 associated with the tracked travel route, including the desired and actual orientations of camera 82 determined at various points in time. Memory 104 may include a hierarchy of cache memory and system memory. Both the cache and system memory may be respectively organized into cache lines and memory pages.

I/O devices 108, as described earlier, may include camera 82, disposed on wearable body 105 and configured to capture images, including time series images; and sensors like GPS 72 configured to provide global positioning system data, gyroscopes 74 configured to provide stability and/or direction reference data, accelerometer 76 configured to provide acceleration (g-force) data, speedometer 78 configured to provide velocity data, and compass 80 configured to provide directional data. Additionally, I/O devices 108 may include a display screen to provide a camera view of camera 82. Further, I/O devices 108 may include communication or networking interfaces (not shown), such as Ethernet, WiFi, 3G/4G, Bluetooth®, Near Field Communication, Universal Serial Bus (USB) and so forth. Except for their usage by the time series imaging technology of the present disclosure, these elements, camera 82, GPS 72, gyroscopes 74, accelerometer 76, speedometer 78, compass 80, display screen, and communication or networking interfaces may be any one of such elements known in the art.

OS 93, except for orientation function 92 configured to continuously/periodically determine the desired and actual direction of camera 82, may similarly be any one of a number of OS known in the art. Likewise, image/video capture application 90, including control function 94, except for the image/video capturing technology of the present disclosure, may be any one of such elements known in the art.

Figure 3:
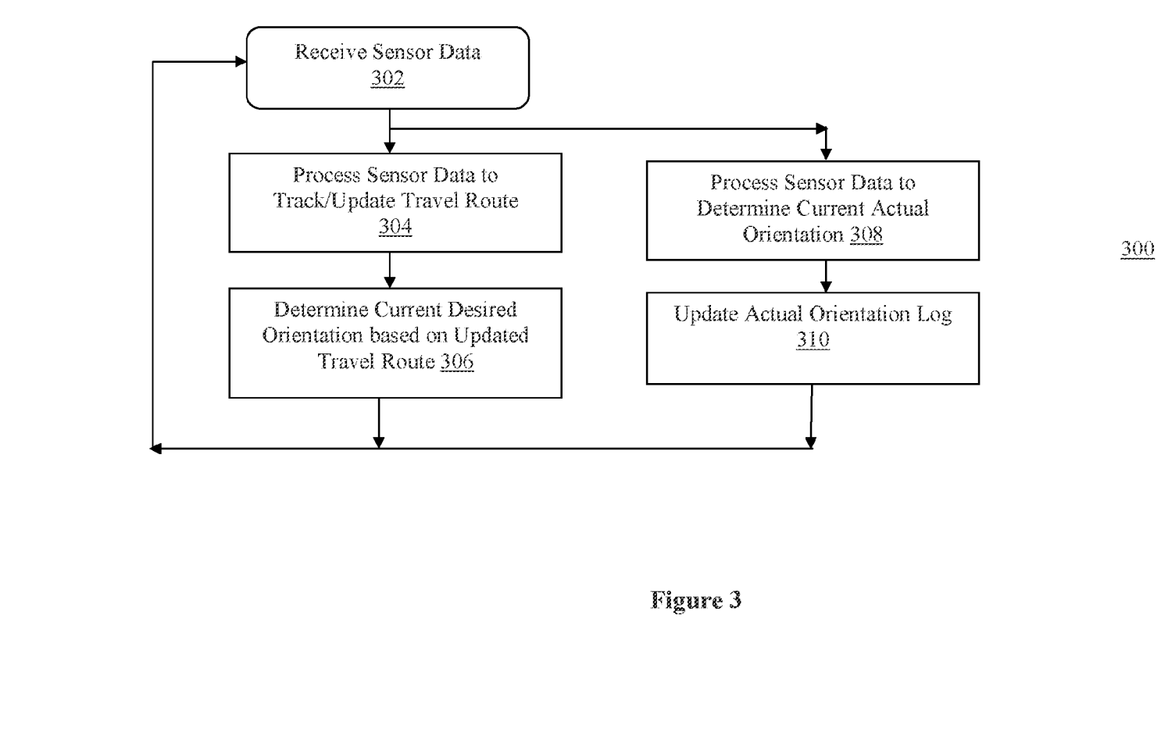
FIG. 3 illustrates an example process for tracking desired and actual orientations of a camera; according to various embodiments.
Figure 4:
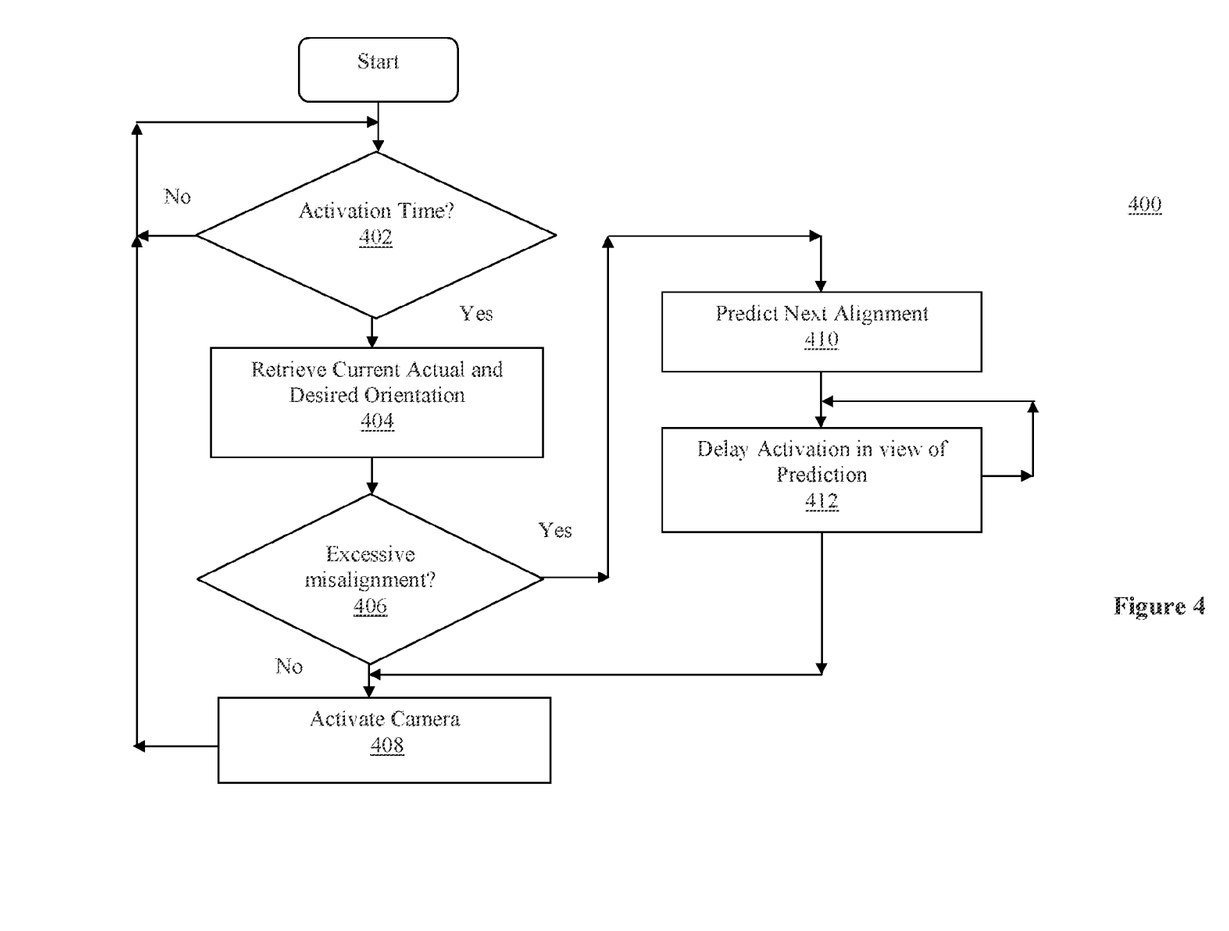
FIG. 4 illustrates an example process for controlling activation of a camera, according to various embodiments.

Orientation function 92 and control function 94 will be further described with references to FIGS. 3 and 4. But before doing so, it should be noted that while for ease of understanding, the image/video capturing technology/functions are being described as distributed and performed by orientation function 92 and control function 94, in alternate embodiments, the functions may be organized in other arrangements. For examples, orientation function 92 may be part of image capture application 90. The functions of determining the actual and desired orientations may be divided into multiple functions, modules or routines, and so forth. Similarly, while for ease of understanding, various sensors 108, such GPS, compass etc. have been described as being disposed in wearable devices, in alternate embodiments, some of these sensors 108 may be disposed with the vehicle the user is traveling in/on or a mobile device, such as a smartphone, located with the user, with wearable device 70 receiving some of the sensed data from these remotely disposed sensors. Conversely, in some embodiments, control function 94 and orientation function 92 may be remotely disposed in the vehicle the user is traveling in/on, or a mobile device, such as a smartphone, located with the user, and receive sensed data from sensors disposed within wearable device 70, process the sensed data, and provide instructions to the camera disposed on wearable device 70.

Referring now FIG. 3, wherein an example process for determining the desired and actual orientations of camera: according to various embodiments, is illustrated. As shown, process 300 for determining the desired and actual orientations of camera may include operations at blocks 302-312. The operations may be performed e.g., by orientation function 92 of FIG. 2. Thus, FIG. 3 also depicts the algorithmic structure of orientation function 92. In alternate embodiments, some of the operations at blocks 302-310 may be split, combined or omitted. Still in other embodiments, process 300 may be practiced with additional operations.

As shown, during operation, process 300 may start at block 302. At block 302, various sensor data, e.g., GPS data, gyroscope data, accelerometer data, speedometer data, compass data and so forth may be received. Next, process 300 may proceed to blocks 304 and/or 308.

At block 304, the sensor data may be processed to track and update the travel route. In embodiments, the travel route may be determined and tracked based on the GPS data, and on determination/update of the travel route, the current desired orientation of the camera may be determined. In some embodiments, the GPS data may be augmented by the gyroscope data, accelerometer data, speedometer data, and/or compass data, when determining and tracking the travel route. In embodiments, a mathematical representation, e.g., a polynomial, may be calculated for tracking the travel route. The polynomial may be computed, e.g., based on regression analysis. In embodiments, the travel route tracked may be limited to a most recent duration, e.g., the last minute, the last 5 minutes or the last 15 minutes and so forth. At block 306, on update of the travel route, the desired orientation of the camera may be determination. For embodiments where a polynomial is computed to tack the travel route, the desired orientations of the camera at various points may be determined based on the tangents at various points of the curve depicted by the polynomial. The tracked travel route, including the desired orientations at various points may be stored and maintained in a data structure, such as a table or a database, in memory of the wearable device.

At block 308, the sensor data may be processed to determine the actual orientation of the camera. In embodiments, the actual orientation of the camera may be determined based on a determination of the current head orientation of the user. In embodiments, the current head orientation of the user may be determined based on the gyroscope data and accelerometer data. At block 310, on determination/update of the current head orientation, a log of the actual orientations the camera along the travel route may be updated. Similar to the travel route including the desired orientations, the actual orientation log may likewise be stored and maintained in the same or a different data structure in memory of the wearable device.

On completion of the operations at blocks 306 and 310, process 300 may return to block 302, and continue therefrom as earlier described. Process 300 may loop continuously during operation (when the wearable device is powered on).

Referring now FIG. 4, wherein an example process for controlling the camera: according to various embodiments, is illustrated. As shown, process 400 for controlling the camera may include operations at blocks 402-412. The operations may be performed e.g., by control function 94 of FIG. 2. Thus, FIG. 4 also depicts the algorithmic structure of control function 94. In alternate embodiments, some of the operations at blocks 402-412 may be split, combined or omitted. Still in other embodiments, process 400 may be practiced with additional operations.

At block 402, a determination may be made on whether it is time to activate the camera to capture an image or video. If a result of the determination is negative, process 400 may remain at block 402, until a result of the determination is positive.

At block 404, on determination that it is time to activate the camera to capture an image or video, the current desired and actual orientation of the camera may be retrieved, e.g., from the earlier described data structures maintained by orientation function 92.

At block 406, on retrieval of the current desired and actual orientations of the camera, a determination may be made on whether the two orientations are substantially aligned, or excessively misaligned, in excess of a misalignment threshold. For example, the two orientations may be considered excessively misaligned if the two orientations are out of alignment by at least 30 degrees. In embodiments, the misalignment threshold may be configurable by the user.

If a result of the determination indicates that the desired and actual orientations are substantially aligned, i.e. not excessively misaligned, process 400 may proceed to block 408. At block 408, the camera may be activated to capture an image or video. On activating the camera and completing capture an image or video, process 400 may return to block 402, and continue therefrom as earlier described.

On the other hand, if a result of the determination indicates that the desired and actual orientations are excessively misaligned, process 400 may proceed to block 410. At block 410, a prediction on when the next point in time the desired and actual orientations may be substantially aligned may be computed. In embodiments, the prediction may be made based on the historical data of the desired and actual orientations along the tracked travel route, that is, the historical durations of misalignment. In embodiments, the prediction may be made using on the Kalman filtering technique. In other embodiments, the prediction may be made using Bayesian inference. Thus, the predictions may be self-leaning/correcting. On computing the prediction, process 400 may proceed to block 412.

At block 412, the activation may be delayed by an amount of time in view of the predicted next point of substantial alignment of the desired and actual orientations. After delaying an amount of time based on the prediction, process 400 may proceed to block 408. At described earlier, at block 408, the camera may be activated to capture an image or video. On activating the camera and completing capturing an image or video, process 400 may return to block 402, and continue therefrom as earlier described. As described earlier, the amount of delay may be limited to a configurable maximum amount.

In various video capturing embodiments, depending on the length of the video to be captured at each activation, process 400 may repeat the alignment determination, and shorten the duration of the video capturing, if the actual and desired orientations became misaligned in excess of the misalignment threshold during capturing of the video.

Process 400 may loop continuously during operation (when the wearable device is powered on).

Note that while for ease of understanding, the desired orientation has generally been described as the forward view depicted e.g., by the tangent of tracked travel route, and the camera is described as being substantially aligned and activated when the head orientation is substantially facing forward, the image capturing technique of the present disclosure is not so limited, and may be practiced with other desired and/or actual orientations. For examples, the camera may be side mounted with the desired view/orientation being 90 degrees offset from the forward view/orientation, or rear mounted with the desired view/orientation being 180 degrees offset from the forward view/orientation. In either case, a determination that the desired and actual orientations are substantially aligned may still be made by detecting for the head orientation being aligned with the tangent of the tracked travel route, when the offset is taken into consideration. Thus, the above described determination of alignment/misalignment applies to any view and/or head orientation, when the offsets are properly taken into consideration.

USAGE EXAMPLES

Example 1

Bob likes to ride the bicycle. He usually rides it during week-ends for several hours, climbing hills and mountains, following the routes of Tour de France, going through magnificent Alpine scenery and lovely landscapes. As an amateur video maker, he would really like to capture hyper lapse movies of his ride, using his sports watches or helmet to record his sports and life experience. Bob travels on roads with traffic, so he has to watch cars passing him, look at traffic signs, and he is sometimes also distracted by side events along the road. So his head frequently turns left and right. Using his regular action camera, his hyper lapse movies have always been disappointing because the camera orientation is always changing, which becomes painful to watch. Using a wearable device incorporated with the image capturing technology of the present disclosure, and taking pictures when the head is properly oriented and with the most appropriate shutter speed might significantly improve his movies quality, and he would finally be sufficiently satisfied with the quality of the hyper lapse movies, and sharing them on social networks.

Example 2

Jessica is a visual art student, and she often records hyper lapse movies while walking across busy pedestrian streets in European old city centers. As she often talks to and interacts with people on the street, she likes to work hands-free and carries smart glasses to perform the recording. As she looks around streets to find her way and avoid obstacles and other pedestrians, her head constantly changes direction. Her action camera is not up to the task because it captures frames at given sampling times, irrespective of her head orientation, resulting in ugly looking movies. So far, she has been using post-production tools to perform stabilization of her movies, but those tools are expensive, and require a great deal of work after the movie has been captured. With the wearable device incorporated with the image capturing technology of the present disclosures, the captured images are most likely to be aligned along the direction of the general path she's following, enhancing the quality of her video movies.

Figure 5:
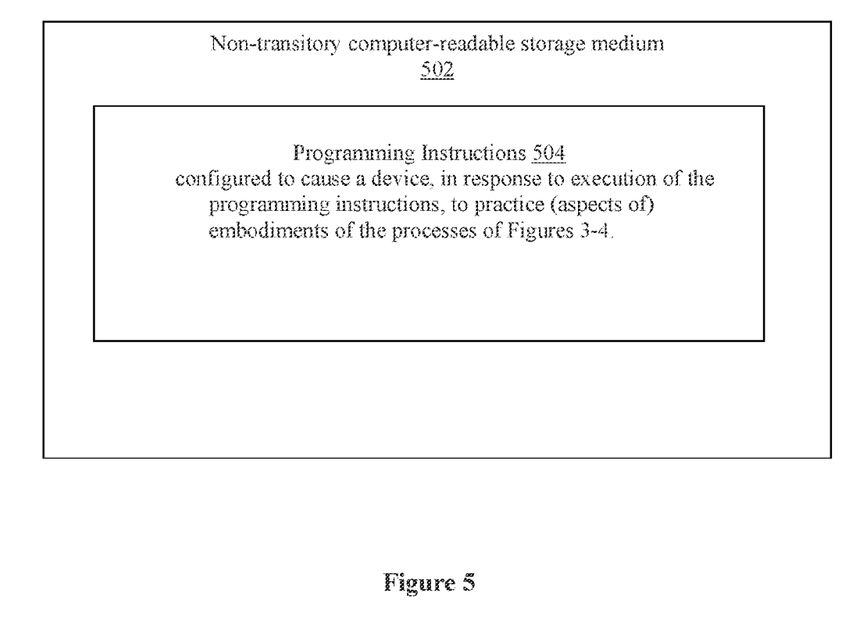
FIG. 5 illustrates a storage medium having instructions for programming a wearable device to practice methods described with references to FIGS. 3-4, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure.

As shown in FIG. 5, non-transitory computer-readable storage medium 502 may include a number of programming instructions 504. Programming instructions 504 may be configured to enable a device, e.g., wearable device 70, in response to execution of the programming instructions by its processor, to perform, e.g., various operations associated with image capturing application 90 and OS 93. In alternate embodiments, programming instructions 504 may be disposed on multiple computer-readable non-transitory storage media 502 instead. In alternate embodiments, programming instructions 504 may be disposed on computer-readable transitory storage media 502, such as, signals.

Any combination of one or more computer usable or computer readable media may be utilized. The computer-usable or computer-readable medium/media may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium/media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 2, for one embodiment, processor 84 may be packaged together with memory having at least some of programming instructions 504 implementing, e.g., orientation function 92 or control function 94 (in lieu of storing in memory 104). For one embodiment, processor 84 may be packaged together with memory having at least some of programming instructions 504 implementing, e.g., orientation function 92 or control function 94, to form a System in Package (SiP). For one embodiment, processor 84 may be integrated on the same die with memory having programming instructions 504 implementing, e.g., orientation function 92 or control function 94. For one embodiment, processor 84 may be packaged together with memory having programming instructions 504 implementing, e.g., orientation function 92 or control function 94 to form a System on Chip (SoC).

Thus various example embodiments of the present disclosure have been described including, but are not limited to:

Example 1 may be an apparatus for capturing images or video, comprising: one or more processors; and an image or video capturing application to be operated by the one or more processors to capture one or more images using a camera worn on a user's head. The image capturing application may include: an orientation function to determine a desired and an actual orientation of the camera, wherein to determine, the orientation function may receive a collection of a plurality of sensor data, and process the collection of sensor data to determine the desired and actual orientations of the camera: and a control function to control the camera, wherein to control, the control function may delay or suspend activation of the camera, if the actual orientation is misaligned with the desired orientation of the camera in excess of a misalignment threshold.

Example 2 may be example 1, wherein to determine the desired orientation, the orientation function may determine a current tangent of a route the user is traveling.

Example 3 may be example 1, wherein to determine an actual orientation, the orientation function may determine a current orientation of the user's head.

Example 4 may be example 1, wherein the orientation function may further estimate when the actual orientation will aligned with the desired orientations of the camera in less than a misalignment threshold.

Example 5 may be example 4, wherein the control function may delay or suspend activation of the camera by an amount of time sufficient for the actual orientation to be aligned with the desired orientation of the camera in less than the misalignment threshold.

Example 6 may be example 1, wherein the image or video capturing application may capture a time series of images or videos using the camera, and the one or more images are of the time series of images or videos; wherein the orientation function may continuously determine the desired and the actual orientation of the camera at each of a number of successive points in time, wherein to continuously determine, the orientation function may periodically receive collections of the plurality of sensor data, and process the collections of the sensor data to determine the desired and actual orientations of the camera at the successive points in time; and wherein to delay or suspend activation of the camera may delay or suspend activation of the camera in capturing a next one of the time series of images, and the control function may delay or suspend activation of the camera in capturing the next one of the time series of images or videos, when at or during a next activation time, the determined actual orientation is misaligned with the determined desired orientations of the camera in excess of a misalignment threshold.

Example 7 may be example 6, wherein the orientation function may process the collections of the sensor data to generate a model of a route the user is traveling; and wherein to determine the desired orientation at each of the successive points in time, the orientation function may determine a tangent of the route for each of the successive points in time.

Example 8 may be example 6, wherein to determine an actual orientation at each of the successive points in time, the orientation function may determine a current orientation of the user's head at each of the successive points in time.

Example 9 may be example 8, wherein to delay or suspend activation of the camera may delay or suspend activation of the camera in capturing a next one of the time series of images or videos; wherein the control function may delay or suspend activation of the camera in capturing the next one of the time series of images or videos, when at or during a next activation time, the determined current orientation of the user's head is misaligned with the determined desired orientations of the camera in excess of a misalignment threshold.

Example 10 may be example 9, wherein the orientation function may further estimate, when the current orientation of the user's head is misaligned with the desired orientations of the camera in excess of the misalignment threshold, when the orientation of the user's head will aligned with the desired orientations of the camera in less than the misalignment threshold.

Example 11 may be example 10, wherein to delay or suspend activation of the camera may delay or suspend activation of the camera in capturing the next one of the time series of images or videos by an amount of time sufficient for the orientation of the user's head to be aligned with the desired orientation of the camera in less than the misalignment threshold.

Example 12 may be any one of examples 1-11 further comprising a wearable body to be worn on the user's head, the camera disposed thereon, and at least two or more of a global positioning system, a gyroscope, an accelerometer, a speedometer, or a compass to provide the sensor data disposed on the wearable body.

Example 13 may be example 12, wherein the apparatus may be an eyewear or a headwear.

Example 14 may be a method for capturing images or videos, comprising: collecting or receiving, by an apparatus, a plurality of sensor data; processing, by the apparatus, the sensor data to determine a desired and an actual orientation of a camera worn on a user's head; and controlling, by the apparatus, the camera, including delaying or suspending activation of the camera to capture one or more images, if the actual orientation is misaligned with the desired orientation of the camera in excess of a misalignment threshold.

Example 15 may be example 14, wherein processing to determine the desired orientation may comprise processing to determine a current tangent of a route the user is traveling.

Example 16 may be example 14, wherein processing to determine an actual orientation may comprise processing to determine a current orientation of the user's head.

Example 17 may be example 14, wherein processing further may comprise estimating when the actual orientation will aligned with the desired orientations of the camera in less than a misalignment threshold.

Example 18 may be example 17, wherein controlling may comprise delaying or suspending activation of the camera by an amount of time sufficient for the actual orientation to be aligned with the desired orientation of the camera in less than the misalignment threshold.

Example 19 may be any one of examples 14-18, wherein the apparatus is a device wearable on the user's head comprising the camera and a plurality of sensors to collect the sensor data, and the one or more image may be part of a time series of images or videos to be captured; wherein processing to determine may comprise continuous processing to determine the desired and the actual orientation of the camera at each of a number of successive points in time, wherein continuous processing may comprise periodically receiving collections of the plurality of sensor data, and processing the collections of the sensor data to determine the desired and actual orientations of the camera at the successive points in time; and wherein delaying or suspending activation of the camera may comprise delaying or suspending activation of the camera in capturing a next one of the time series of images or videos, and delaying or suspending activation of the camera in capturing the next one of the time series of images or videos may comprise delaying or suspending at or during a next activation time, when at or during the next activation time, the determined actual orientation is misaligned with the determined desired orientations of the camera in excess of a misalignment threshold.

Example 20 may be example 19, wherein processing may comprise processing the collections of the sensor data to generate a model of a route the user is traveling; and wherein processing to determine the desired orientation at each of the successive points in time may comprise processing to determine a tangent of the route for each of the successive points in time.

Example 21 may be example 19, wherein processing to determine may comprise processing to determine a current orientation of the user's head at each of the successive points in time.

Example 22 may be example 21, wherein delaying or suspending activation of the camera may comprise delaying or suspending activation of the camera in capturing a next one of the time series of images or videos; wherein delaying or suspending activation of the camera in capturing the next one of the time series of images or videos may comprise delaying or suspending activation at or during a next activation time, when at or during the next activation time, the determined current orientation of the user's head is misaligned with the determined desired orientations of the camera in excess of a misalignment threshold.

Example 23 may be example 22, wherein processing further may comprise estimating, when the current orientation of the user's head is misaligned with the desired orientations of the camera in excess of the misalignment threshold, when the orientation of the user's head will be aligned with the desired orientations of the camera in less than the misalignment threshold.

Example 24 may be example 23, wherein delaying or suspending activation of the camera may comprise delaying or suspending activation of the camera in capturing the next one of the time series of images or videos by an amount of time sufficient for the orientation of the user's head to be aligned with the desired orientation of the camera in less than the misalignment threshold.

Example 25 may be one or more computer-readable media comprising instructions that cause an apparatus, in response to execution of the instructions by a processor of the apparatus, to cause the apparatus to collect a plurality of sensor data; process the sensor data to determine a desired and an actual orientation of a camera worn on a user's head; and control the camera, including delay or suspend activation of the camera to capture one or more images, if the actual orientation is misaligned with the desired orientation of the camera in excess of a misalignment threshold.

Example 26 may be example 25, wherein to determine the desired orientation may comprise to determine a current tangent of a route the user is traveling.

Example 27 may be example 25, wherein to determine an actual orientation may comprise to determine a current orientation of the user's head.

Example 28 may be example 25, wherein the wearable device may be further caused to estimate when the actual orientation will be aligned with the desired orientations of the camera in less than a misalignment threshold.

Example 29 may be example 28, wherein to delay or suspend may comprise to delay or suspend activation of the camera by an amount of time sufficient for the actual orientation to be aligned with the desired orientation of the camera in less than the misalignment threshold.

Example 30 may be any one of examples 25-29, wherein the apparatus is a device wearable on the user's head comprising the camera and a plurality of sensors to collect the sensor data, and the one or more images are of the time series of images or videos; wherein to process may comprise to continuously determine the desired and the actual orientation of the camera at each of a number of successive points in time, wherein to continuously determine may comprise to periodically receive collections of the plurality of sensor data, and process the collections of the sensor data to determine the desired and actual orientations of the camera at the successive points in time; and wherein to delay or suspend activation of the camera may comprise to delay suspend activation of the camera in capturing a next one of the time series of images or videos, and to delay suspend activation of the camera in capturing the next one of the time series of images may comprise to delay suspend at or during a next activation time, when at or during the next activation time, the determined actual orientation is misaligned with the determined desired orientations of the camera in excess of a misalignment threshold.

Example 31 may be example 30, wherein to process may comprise to process the collections of the sensor data to generate a model of a route the user is traveling; and wherein to determine the desired orientation at each of the successive points in time may comprise to determine a tangent of the route for each of the successive points in time.

Example 32 may be example 30, wherein to determine an actual orientation at each of the successive points in time may comprise to determine a current orientation of the user's head at each of the successive points in time.

Example 33 may be example 32, wherein to delay suspend activation of the camera may delay suspend activation of the camera in capturing a next one of the time series of images or videos; wherein to delay suspend activation of the camera in capturing the next one of the time series of images or videos may comprise to delay suspend at or during a next activation time, when at or during the next activation time, the determined current orientation of the user's head is misaligned with the determined desired orientations of the camera in excess of a misalignment threshold.

Example 34 may be example 33, wherein the wearable device may be further caused to estimate, when the current orientation of the user's head is misaligned with the desired orientations of the camera in excess of the misalignment threshold, when the orientation of the user's head will be aligned with the desired orientations of the camera in less than the misalignment threshold.

Example 35 may be example 24, wherein to delay or suspend activation of the camera may comprise to delay or suspend activation of the camera in capturing the next one of the time series of images or videos by an amount of time sufficient for the orientation of the user's head to be aligned with the desired orientation of the camera in less than the misalignment threshold.

Example 36 may be an apparatus for capturing images or videos, comprising: means for collecting a plurality of sensor data; means for processing the sensor data to determine a desired and an actual orientation of a camera worn on a user's head; and means for controlling the camera, including means for delaying or suspending activation of the camera to capture one or more images, if the actual orientation is misaligned with the desired orientation of the camera in excess of a misalignment threshold.

Example 37 may be example 36, wherein means for processing to determine the desired orientation may comprise means processing to determine a current tangent of a route the user is traveling.

Example 38 may be example 36, wherein means for processing to determine an actual orientation may comprise means for processing to determine a current orientation of the user's head.

Example 39 may be example 36, wherein means for processing further may comprise means for estimating when the actual orientation will be aligned with the desired orientations of the camera in less than a misalignment threshold.

Example 40 may be example 39, wherein means for controlling may comprise means for delaying or suspending activation of the camera by an amount of time sufficient for the actual orientation to be aligned with the desired orientation of the camera in less than the misalignment threshold.

Example 41 may be any one of examples 36-40, wherein the apparatus is a device wearable on the user's head comprising the camera and a plurality of sensors to collect the sensor data, and the one or more images are part of a time series of images or videos to be captured; wherein means for processing to determine may comprise means for continuous processing to determine the desired and the actual orientation of the camera at each of a number of successive points in time, wherein means for continuous processing may comprise means for periodically receiving collections of the plurality of sensor data, and processing the collections of the sensor data to determine the desired and actual orientations of the camera at the successive points in time; and wherein means for delaying or suspending activation of the camera may comprise means for delaying or suspending activation of the camera in capturing a next one of the time series of images or videos, and means for delaying or suspending activation of the camera in capturing the next one of the time series of images or videos may comprise means for delaying or suspending at or during a next activation time, when at or during the next activation time, the determined actual orientation is misaligned with the determined desired orientations of the camera in excess of a misalignment threshold.

Example 42 may be example 41, wherein means for processing may comprise means for processing the collections of the sensor data to generate a model of a route the user is traveling; and wherein means for processing to determine the desired orientation at each of the successive points in time may comprise means for processing to determine a tangent of the route for each of the successive points in time.

Example 43 may be example 41, wherein means for processing to determine may comprise means for processing to determine a current orientation of the user's head at each of the successive points in time.

Example 44 may be example 43, wherein means for delaying or suspending activation of the camera may comprise means for delaying or suspending activation of the camera in capturing a next one of the time series of images or videos; wherein means for delaying or suspending activation of the camera in capturing the next one of the time series of images or videos may comprise means for delaying or suspending activation at or during a next activation time, when at or during the next activation time, the determined current orientation of the user's head is misaligned with the determined desired orientations of the camera in excess of a misalignment threshold.

Example 45 may be example 44, wherein means for processing further may comprise means for estimating, when the current orientation of the user's head is misaligned with the desired orientations of the camera in excess of the misalignment threshold, when the orientation of the user's head will be aligned with the desired orientations of the camera in less than the misalignment threshold.

Example 46 may be example 45, wherein means for delaying or suspending activation of the camera may comprise means for delaying or suspending activation of the camera in capturing the next one of the time series of images or videos by an amount of time sufficient for the orientation of the user's head to be aligned with the desired orientation of the camera in less than the misalignment threshold.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claim and its equivalents.

What is claimed is:

1. An apparatus for capturing images or videos, comprising:
   one or more processors; and
   an image or video capturing application to be operated by the one or more processors to capture one or more images using a camera worn on a user's head, that includes:
   an orientation function to determine a desired and an actual orientation of the camera, wherein to determine, the orientation function is to receive a collection of a plurality of sensor data, and process the collection of sensor data to determine the desired and actual orientations of the camera; and
   a control function to control the camera, wherein to control, the control function is to delay or suspend activation of the camera, if the actual orientation is misaligned with the desired orientation of the camera in excess of a misalignment threshold;
   wherein the orientation function is to further estimate when the actual orientation will align with the desired orientation of the camera at less than the misalignment threshold.

2. The apparatus of claim 1, wherein to determine the desired orientation, the orientation function is to determine a current tangent of a route the user is traveling.

3. The apparatus of claim 1, wherein to determine the actual orientation, the orientation function is to determine a current orientation of the user's head.

4. The apparatus of claim 1, wherein the control function is to delay or suspend activation of the camera by an amount of time sufficient for the actual orientation to be aligned with the desired orientation of the camera in less than the misalignment threshold.

5. The apparatus of claim 1, further comprising a wearable body to be worn on the user's head, the camera disposed thereon, and at least two or more of a global positioning system, a gyroscope, an accelerometer, a speedometer, or a compass disposed on the wearable body to provide the sensor data.

6. The apparatus of claim 5, wherein the apparatus is an eyewear or a headwear.

7. An apparatus for capturing images or videos, comprising:
   one or more processors; and
   an image or video capturing application to be operated by the one or more processors to capture one or more images using a camera worn on a user's head, that includes:
   an orientation function to determine a desired and an actual orientation of the camera, wherein to determine, the orientation function is to receive a collection of a plurality of sensor data, and process the collection of sensor data to determine the desired and actual orientations of the camera; and
      a control function to control the camera, wherein to control, the control function is to delay or suspend activation of the camera, if the actual orientation is misaligned with the desired orientation of the camera in excess of a misalignment threshold;
   wherein the image or video capturing application is to capture a time series of images or videos using the camera, and the one or more images are part of the time series of images or videos;
   wherein the orientation function is to continuously determine the desired and the actual orientation of the camera at each of a number of successive points in time, wherein to continuously determine, the orientation function is to periodically receive collections of the plurality of sensor data, and process the collections of the sensor data to determine the desired and actual orientations of the camera at the successive points in time;
   wherein to delay or suspend activation of the camera is to delay or suspend activation of the camera in capturing a next one of the time series of images or videos, and the control function is to delay or suspend activation of the camera in capturing the next one of the time series of images or videos, when at or during a next activation time, the determined actual orientation is misaligned with the determined desired orientations of the camera in excess of a misalignment threshold; and
   wherein the orientation function is to process the collections of the sensor data to generate a model of a route the user is traveling; and wherein to determine the desired orientation at each of the successive points in time, the orientation function is to determine a tangent of the route for each of the successive points in time.

8. The apparatus of claim 7, wherein to determine an actual orientation at each of the successive points in time, the orientation function is to determine a current orientation of the user's head at each of the successive points in time.

9. The apparatus of claim 8, wherein to delay or suspend activation of the camera is to delay or suspend activation of the camera in capturing a next one of the time series of images or videos; wherein the control function is to delay or suspend activation of the camera in capturing the next one of the time series of images or videos, when at or during a next activation time, the determined current orientation of the user's head is misaligned with the determined desired orientations of the camera in excess of a misalignment threshold.

10. The apparatus of claim 9, wherein the orientation function is to further estimate, when the current orientation of the user's head is misaligned with the desired orientations of the camera in excess of the misalignment threshold, when the orientation of the user's head will be aligned with the desired orientations of the camera in less than the misalignment threshold.

11. The apparatus of claim 10, wherein to delay or suspend activation of the camera is to delay or suspend activation of the camera in capturing the next one of the time series of images or videos by an amount of time sufficient for the orientation of the user's head to be aligned with the desired orientation of the camera in less than the misalignment threshold.

12. A method for capturing images or videos, comprising:
   receiving, by an apparatus, a plurality of sensor data;
   processing, by the apparatus, the sensor data to determine a desired and an actual orientation of a camera worn on a user's head; and
   controlling, by the apparatus, the camera, including delaying or suspending activation of the camera to capture one or more images, if the actual orientation is misaligned with the desired orientation of the camera in excess of a misalignment threshold;
   wherein processing further comprises estimating when the actual orientation will be aligned with the desired orientations of the camera at less than a misalignment threshold.

13. The method of claim 12, wherein processing to determine the desired orientation comprises processing to determine a current tangent of a route the user is traveling.

14. The method of claim 12, wherein processing to determine the actual orientation comprises processing to determine a current orientation of the user's head.

15. The method of claim 12, wherein controlling comprises delaying activation of the camera by an amount of time sufficient for the actual orientation to be aligned with the desired orientation of the camera in less than the misalignment threshold.

16. The method of claim 12, wherein the apparatus is a device wearable on the user's head comprising the camera and a plurality of sensors to collect the sensor data, and the one or more images are part of a time series of images or videos to be captured;
   wherein processing to determine comprises continuous processing to determine the desired and the actual orientation of the camera at each of a number of successive points in time, wherein continuous processing comprises periodically receiving collections of the plurality of sensor data, and processing the collections of the sensor data to determine the desired and actual orientations of the camera at the successive points in time; and
   wherein delaying or suspending activation of the camera comprises delaying or suspending activation of the camera in capturing a next one of the time series of images or videos, and delaying or suspending activation of the camera in capturing the next one of the time series of images or videos comprises delaying or suspending at or during a next activation time, when at or during the next activation time, the determined actual orientation is misaligned with the determined desired orientations of the camera in excess of a misalignment threshold.

17. One or more non-transitory computer-readable media comprising instructions that cause an apparatus, in response to execution of the instructions by a processor of the apparatus, to cause the apparatus to collect or receive a plurality of sensor data; process the sensor data to determine a desired and an actual orientation of a camera of a wearable device; and control the camera, including delay or suspend activation of the camera to capture one or more images, if the actual orientation is misaligned with the desired orientation of the camera in excess of a misalignment threshold;

wherein the apparatus is a device wearable on a user's head comprising the camera and a plurality of sensors to collect the sensor data, and the one or more images are part of a time series of images or videos;

wherein to process comprises to continuously determine the desired and the actual orientation of the camera at each of a number of successive points in time, wherein to continuously determine comprise to periodically receive collections of the plurality of sensor data, and process the collections of the sensor data to determine the desired and actual orientations of the camera at the successive points in time;

wherein to delay or suspend activation of the camera comprises to delay or suspend activation of the camera in capturing a next one of the time series of images or videos, and to delay or suspend activation of the camera in capturing the next one of the time series of images or videos comprises to delay or suspend at a next activation time, when at or during the next activation time, the determined actual orientation is misaligned with the determined desired orientations of the camera in excess of a misalignment threshold; and wherein to process comprises to process the collections of the sensor data to generate a model of a route the user is traveling; and wherein to determine the desired orientation at each of the successive points in time comprises to determine a tangent of the route for each of the successive points in time.

18. The one or more non-transitory computer-readable media of claim 17, wherein to determine an actual orientation at each of the successive points in time comprises to determine a current orientation of the user's head at each of the successive points in time.

19. The one or more non-transitory computer-readable media of claim 18, wherein to delay or suspend activation of the camera is to delay or suspend activation of the camera in capturing a next one of the time series of images or videos; wherein to delay or suspend activation of the camera in capturing the next one of the time series of images or videos comprises to delay or suspend at or during a next activation time, when at or during the next activation time, the determined current orientation of the user's head is misaligned with the determined desired orientations of the camera in excess of a misalignment threshold.

20. The one or more non-transitory computer-readable media of claim 19, wherein the wearable device is further caused to estimate, when the current orientation of the user's head is misaligned with the desired orientations of the camera in excess of the misalignment threshold, when the orientation of the user's head will be aligned with the desired orientations of the camera in less than the misalignment threshold.

* * * * *